(12) United States Patent
Ji

(10) Patent No.: US 11,971,780 B2
(45) Date of Patent: Apr. 30, 2024

(54) DATA ERROR CORRECTION CIRCUIT AND DATA TRANSMISSION CIRCUIT

(71) Applicant: CHANGXIN MEMORY TECHNOLOGIES, INC., Hefei (CN)

(72) Inventor: Kangling Ji, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 27 days.

(21) Appl. No.: 17/810,025

(22) Filed: Jun. 30, 2022

(65) Prior Publication Data

US 2023/0267037 A1 Aug. 24, 2023

Related U.S. Application Data

(63) Continuation of application No. PCT/CN2022/087984, filed on Apr. 20, 2022.

(30) Foreign Application Priority Data

Feb. 24, 2022 (CN) .......................... 202210173543.8

(51) Int. Cl.
*G06F 11/07* (2006.01)
*G06F 11/10* (2006.01)
*G06F 13/40* (2006.01)

(52) U.S. Cl.
CPC ...... *G06F 11/0793* (2013.01); *G06F 11/0745* (2013.01); *G06F 11/1048* (2013.01); *G06F 13/4004* (2013.01)

(58) Field of Classification Search
CPC ............. G06F 11/0793; G06F 11/0745; G06F 11/1048; G06F 13/4004
See application file for complete search history.

(56) References Cited

U.S. PATENT DOCUMENTS

| 4,858,236 A | 8/1989 | Ogasawara |
| 5,335,234 A | 8/1994 | Matteson et al. |

(Continued)

FOREIGN PATENT DOCUMENTS

| CN | 1155950 A | 7/1997 |
| CN | 1156280 A | 8/1997 |

(Continued)

OTHER PUBLICATIONS

G. Caire and E. Biglieri, "Parallel concatenated codes with unequal error protection," in IEEE Transactions on Communications, vol. 46, No. 5, pp. 565-567, May 1998 (Year: 1998).*

(Continued)

*Primary Examiner* — Cynthia Britt
(74) *Attorney, Agent, or Firm* — Cooper Legal Group, LLC

(57) ABSTRACT

A data error correction circuit and a data transmission circuit are disclosed. The data error correction circuit includes: a decoding circuit having an input terminal connected to a data bus, and configured to receive first data and a check code of the first data and output an error correction code of the first data based on the check code; and an error correction latch module having a first input terminal connected to the data bus and a second input terminal connected to an output terminal of the decoding circuit, and configured to latch the first data corresponding to the error correction code and generate and output second data according to the error correction code and the corresponding first data.

10 Claims, 8 Drawing Sheets

(56) References Cited

U.S. PATENT DOCUMENTS

| | | | |
|---|---|---|---|
| 6,058,499 A | 5/2000 | Sim | |
| 6,522,581 B2 | 2/2003 | Takata et al. | |
| 8,041,890 B2 | 10/2011 | Wei | |
| 10,355,833 B2 | 7/2019 | Chung et al. | |
| 10,846,171 B2 | 11/2020 | Cho et al. | |
| 11,314,592 B2 | 4/2022 | Song et al. | |
| 11,416,335 B2 | 8/2022 | Cho et al. | |
| 2002/0051401 A1 | 5/2002 | Lee | |
| 2006/0112239 A1 | 5/2006 | Ruckerbauer et al. | |
| 2006/0200728 A1 | 9/2006 | Nagai et al. | |
| 2007/0234181 A1 | 10/2007 | Jarrar et al. | |
| 2009/0073009 A1 | 3/2009 | Oda | |
| 2010/0199138 A1* | 8/2010 | Rho | G11C 16/26 714/E11.063 |
| 2012/0198313 A1 | 8/2012 | Alam et al. | |
| 2012/0246507 A1 | 9/2012 | Luo et al. | |
| 2020/0293400 A1* | 9/2020 | Steiner | G11C 29/52 |
| 2021/0407576 A1 | 12/2021 | Shang et al. | |
| 2022/0209791 A1* | 6/2022 | Steiner | H03M 13/118 |

FOREIGN PATENT DOCUMENTS

| | | | |
|---|---|---|---|
| CN | 1804815 A | 7/2006 |
| CN | 1832489 A | 9/2006 |
| CN | 101281481 A | 10/2008 |
| CN | 101354666 A | 1/2009 |
| CN | 106297895 A | 1/2017 |
| CN | 108447514 A | 8/2018 |
| CN | 112992257 A | 6/2021 |
| CN | 113094203 A | 7/2021 |
| CN | 113470711 A | 10/2021 |
| EP | 2455942 A2 | 5/2012 |

OTHER PUBLICATIONS

International Search Report cited in PCT/CN2022/087961 dated Sep. 27, 2022, 10 pages.
International Search Report cited in PCT/CN2022/087829 dated Oct. 25, 2022, 8 pages.
International Search Report cited in PCT/CN2022/087984 dated Nov. 25, 2022, 10 pages.
TW Office Action cited in TW111127644, dated Aug. 29, 2023, 11 pages.
EP Search Report cited in EP22740274.0, mailed Dec. 1, 2023, 8 pages.

* cited by examiner

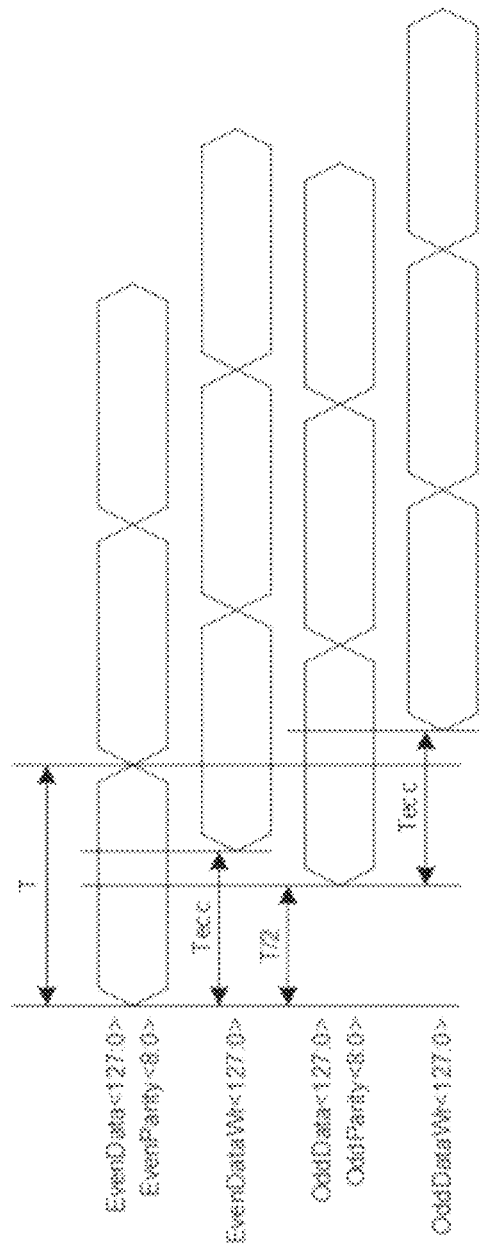

DATA ERROR CORRECTION CIRCUIT AND DATA TRANSMISSION CIRCUIT

CROSS-REFERENCE TO RELATED APPLICATIONS

This is a continuation of International Application No. PCT/CN2022/087984, filed on Apr. 20, 2022, which claims the priority to Chinese Patent Application No. 202210173543.8, titled "DATA ERROR CORRECTION CIRCUIT AND DATA TRANSMISSION CIRCUIT" and filed on Feb. 24, 2022. The entire contents of International Application No. PCT/CN2022/087984 and Chinese Patent Application No. 202210173543.8 are incorporated herein by reference.

TECHNICAL FIELD

The present disclosure relates to the technical field of electronic circuits, and specifically, to a data error correction circuit and a data transmission circuit that can perform data processing efficiently.

BACKGROUND

A data error correction circuit is a technology that can check and correct data errors. A minimum of one bit of data transmission error can be corrected by checking target data by using an error correcting code (ECC) check code transmitted together with the target data. Data error correction circuits are widely used in memories and other circuits that need to maintain accurate data transmission.

In a memory, to-be-transmitted data is usually divided into odd data and even data for alternate transmission. The odd data is sampled by an odd clock and transmitted through an odd data signal line. The even data is sampled by an even clock and transmitted through an even data signal line. The odd data signal line and the even data signal line are arranged in parallel, and the odd data and the even data are alternately transmitted, such that signal crosstalk between the signal lines can be avoided, thereby improving data transmission reliability.

In some embodiments, when the to-be-transmitted data needs to be checked and corrected by using a data error correction circuit, due to a relatively long processing time of the data error correction circuit, the even data cannot be checked or corrected before arrival of the odd data, or the odd data cannot be checked or corrected before arrival of the even data. Therefore, data error correction circuits need to be respectively provided on the odd data signal line and the even data signal line. However, because the data error correction circuit occupies a relatively large area, an overall area occupied by a data transmission circuit is relatively large in layout.

It should be noted that the information disclosed above is merely intended to facilitate a better understanding of the background of the present disclosure, and therefore may include information that does not constitute the prior art known to those of ordinary skill in the art.

SUMMARY

According to a first aspect of the present disclosure, a data error correction circuit is provided, including: a decoding circuit having an input terminal connected to a data bus, and configured to receive first data and a check code of the first data and output an error correction code of the first data based on the check code; and an error correction latch module having a first input terminal connected to the data bus and a second input terminal connected to an output terminal of the decoding circuit, and configured to latch the first data corresponding to the error correction code and generate and output second data according to the error correction code and the corresponding first data.

According to a second aspect of the present disclosure, a data transmission circuit is provided, including: an odd data signal line configured to transmit odd data; an even data signal line configured to transmit even data, where the even data and the odd data are alternately transmitted at intervals, and there is a first time interval between a time of arrival of the even data and a time of arrival of the odd data; and the data error correction circuit according to any one of the above descriptions, having an input terminal connected to the odd data signal line and the even data signal line and an output terminal connected to an output bus, where the output bus is electrically connected to a memory block, and the data error correction circuit is configured to perform error correction on the odd data or the even data when the odd data or the even data is written into the memory block.

According to a third aspect of the present disclosure, a data transmission circuit is provided, including: a first data signal line configured to transmit odd data and even data, where the even data and the odd data are alternately transmitted at intervals, and there is a first time interval between a time of arrival of the even data and a time of arrival of the odd data; and the data error correction circuit according to any one of the above descriptions, having an input terminal connected to the first data signal line and an output terminal connected to an output bus, where the output bus is electrically connected to a memory block, and the data error correction circuit is configured to perform error correction on the odd data or the even data when the odd data or the even data is written into the memory block.

It should be understood that the above general description and the following detailed description are only exemplary and explanatory, and should not be construed as a limitation to the present disclosure.

BRIEF DESCRIPTION OF THE DRAWINGS

The accompanying drawings incorporated into the specification and constituting part of the specification illustrate the embodiments of the present disclosure, and serve, together with the specification, to explain the principles of the present disclosure. Apparently, the accompanying drawings in the following description show merely some embodiments of the present disclosure, and those of ordinary skill in the art may still derive other accompanying drawings from these drawings without creative efforts.

FIG. 1B is a data processing timing diagram of the data error correction circuit shown in FIG. 1A;

DETAILED DESCRIPTION

Figure 1A:
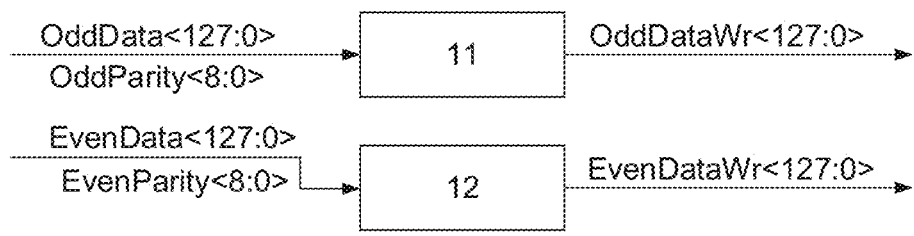
FIG. 1A is a schematic diagram of a connection relationship of a data error correction circuit in the related art.

The exemplary implementations are described more comprehensively below with reference to the accompanying drawings. However, the exemplary implementations can be implemented in various forms and should not be construed as being limited to examples described herein. On the contrary, these implementations are provided such that the present disclosure is more comprehensive and complete, and fully conveys the concept of the exemplary implementations to those skilled in the art. The described features, structures, or characteristics may be incorporated into one or more implementations in any suitable manner. In the following description, many specific details are provided to give a full understanding of the implementations of the present disclosure. However, those skilled in the art will be aware that the technical solutions of the present disclosure may be practiced with one or more of the specific details omitted, or other methods, components, apparatuses, steps, and the like may be used. In other cases, the publicly known technical solutions are not illustrated or described in detail, so as to avoid overshadowing and obscuring various aspects of the present disclosure.

In addition, the accompanying drawings are merely schematic diagrams of the present disclosure, and identical reference numerals in the accompanying drawings denote identical or similar parts. Therefore, repeated description thereof will be omitted. Some of the block diagrams shown in the accompanying drawings are functional entities, and do not necessarily correspond to physically or logically independent entities. These functional entities may be implemented in the form of software, or implemented in one or more hardware modules or integrated circuits, or implemented in different networks and/or processor apparatuses and/or microcontroller apparatuses.

The following describes in detail the exemplary implementations of the present disclosure with reference to the accompanying drawings.

FIG. 1A is a schematic diagram of a connection relationship of a data error correction circuit in the related art. FIG. 1B is a data processing timing diagram of the data error correction circuit shown in FIG. 1A.

Referring to FIG. 1A, in the related art, an odd data signal line transmits odd data OddData<127:0> and an ECC check code OddParity<8:0> of the odd data, error correction is performed by using an odd data error correction unit 11 provided on the odd data signal line, and error correction data OddDataWr<127:0> is output. An even data signal line transmits even data EvenData<127:0> and an ECC check code EvenParity<8:0> of the even data, error correction is performed by using an even data error correction unit 12 provided on the even data signal line, and error correction data EvenDataWr<127:0> is output. This is because in a timing (referring to FIG. 1B), both the odd data OddData<127:0> and the even data EvenData<127:0> have a transmission period of T, and both are alternately transmitted with a transmission interval of T/2. However, the odd data error correction unit 11 or the even data error correction unit 12 each has an error correction processing time of Tecc, and Tecc>T/2. Consequently, one error correction unit cannot process the odd data and the even data that arrive alternately within the time T/2. Therefore, two error correction units are required, to process the odd data and the even data, respectively.

Figure 2:
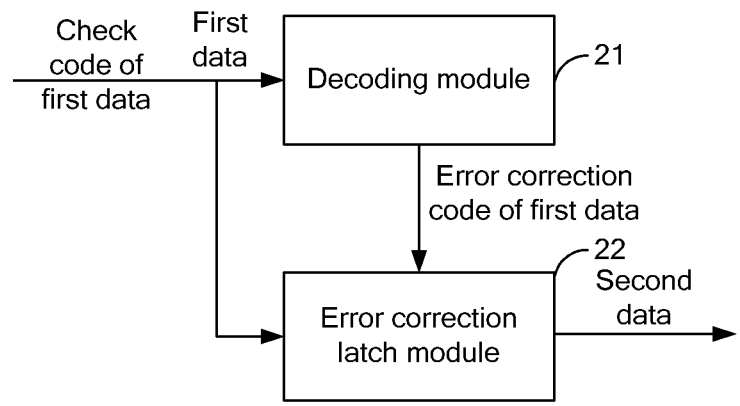
FIG. 2 is a schematic structural diagram of a data error correction circuit according to an exemplary embodiment of the present disclosure.

FIG. 2 is a schematic structural diagram of a data error correction circuit according to an exemplary embodiment of the present disclosure.

Referring to FIG. 2, the data error correction circuit 200 may include:

a decoding circuit 21, having an input terminal connected to a data bus, and configured to receive first data and a check code of the first data and output an error correction code of the first data based on the check code; and an error correction latch module 22, having a first input terminal connected to the data bus and a second input terminal connected to an output terminal of the decoding circuit 21, and configured to latch the first data corresponding to the error correction code and generate and output second data according to the error correction code and the corresponding first data.

In an embodiment of the present disclosure, the first data is, for example, 128 bits, represented as Data<127:0>. Correspondingly, the check code of the first data may be an ECC check code. When the first data is 128 bits, the ECC check code of the first data may be represented as Parity<8:0>, and each bit of the ECC check code is an exclusive OR result (that is, a row check value) of data in a different row of the first data, or an exclusive OR result (that is, a column check value) of data in a different column of the first data. The decoding circuit 21 generates a corresponding row check value and a corresponding column check value for the first data according to ECC check logic, compares the generated row check value and column check value with a row check value and a column check value that are recorded in the ECC check code, determines an abnormal data bit of the first data according to a position of the check code in which a comparison result indicates inconsistency, and then outputs an error correction code of the first data.

In this embodiment of the present disclosure, when the first data is 128 bits, the error correction code of the first data is data of 128 bits, and each bit in the error correction code indicates whether a corresponding bit in the first data is incorrect. For example, if bit 6 of the first data is incorrect, bit 6 in the error correction code has a value of 1. If bit 0 in the first data is correct, bit 0 in the error correction code has a value of 0. In this case, if a check result of the first data is consistent with the ECC check code, the error correction code of the first data is all 0s. If the check result of the first data is inconsistent with the ECC check code, a corresponding bit of the error correction code of the first data is set to 1, and the error correction code is embodied in different values depending on positions of errors. In other embodiments of the present disclosure, the error correction code may alternatively be set in such a manner that 1 is used to represent that the corresponding bit in the first data is correct, and 0 is used to represent that the corresponding bit in the first data is incorrect. This is not specially limited in the present disclosure.

The error correction latch module 22 is configured to latch the first data and perform error correction on the first data according to the error correction code of the first data. It should be noted that, the first data is cyclically sent within a transmission period corresponding to the first data; therefore, when the first data enters the decoding circuit 21 and is checked and calculated by the decoding circuit 21, the error correction latch module 22 can delay the latching of the first data and continue to perform error correction on data currently being processed, and it is necessary to only ensure that the error correction latch module 22 can latch, within the transmission period of the first data, first data that is transmitted at a particular time.

It can be learned based on the foregoing content that, an error correction code generation step (check step) and an error correction step for data error correction are separated, such that when the error correction latch module 22 performs error correction processing on previous data (one of the odd data or the even data), the decoding circuit 21 can simultaneously check and decode subsequent data (the other one of the odd data or the even data). In this way, when the subsequent data arrives, the error correction latch module 22 can continue to perform error correction processing on the previous data, and the decoding circuit 21 can process the subsequent data in a timely manner, thereby avoiding loss of the subsequent data due to a relatively long overall time for checking and error correction of the previous data, or avoiding interruption of the processing procedure of the current data (previous data).

Figure 3:
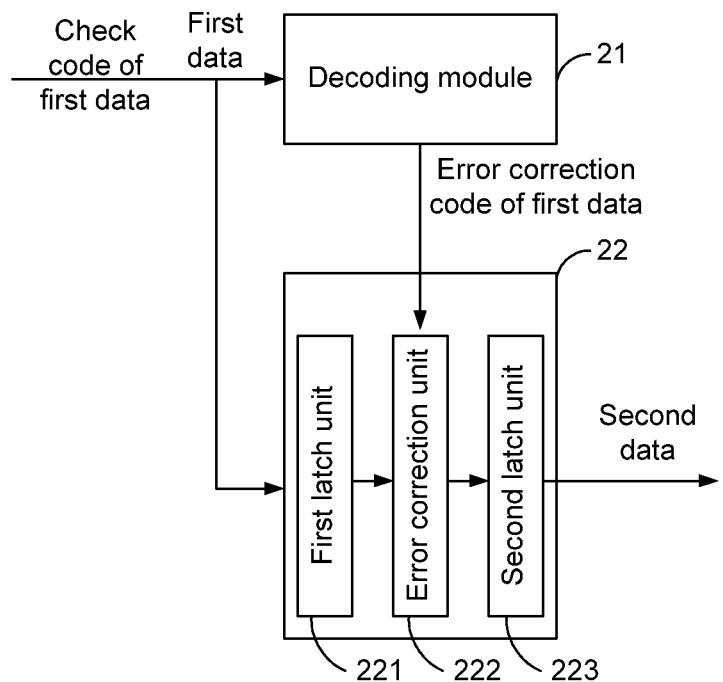
FIG. 3 is a block diagram of an error correction latch module according to an embodiment of the present disclosure.

FIG. 3 is a block diagram of an error correction latch module according to an embodiment of the present disclosure.

Referring to FIG. 3, in an embodiment, the error correction latch module 22 may include:

a first latch unit 221, having an input terminal connected to the data bus, and configured to latch the first data;

an error correction unit 222, connected to an output terminal of the first latch unit 221 and the output terminal of the decoding circuit 21, and configured to perform error correction on the corresponding first data according to the error correction code and output the second data after the error correction; and a second latch unit 223, having an input terminal connected to an output terminal of the error correction unit 222, and configured to latch and output the second data.

In an embodiment, the first data includes M bits of data, and the first latch unit 221 includes N L-bit latches, where N*L=M, and L=M is a quantity of bits, and in the first data of 128 bits, M=128.

The first latch unit 221 may be implemented by using one or more latches or shift registers.

Figure 4:
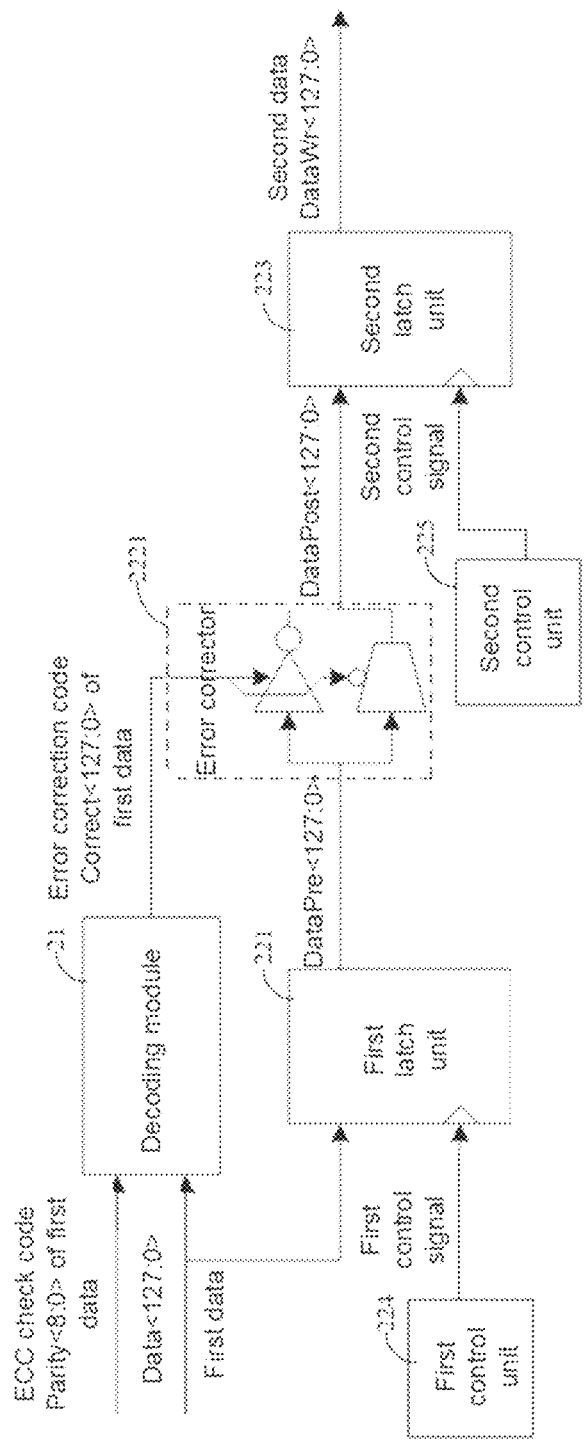
FIG. 4 is a circuit diagram of an error correction latch module according to an embodiment of the present disclosure.

FIG. 4 is a circuit diagram of an error correction latch module according to an embodiment of the present disclosure.

Referring to FIG. 4, in an embodiment, N=1, L=M, the first latch unit 221 is implemented by using one M-bit shift register. For example, when the first data is data of 128 bits, M=128, and the first latch unit 221 is a 128-bit shift register. In this case, the first latch unit 221 performs serial input.

When performing serial output, the first latch unit 221 has one output terminal. A data input port of the error correction unit 222 is one input terminal. The error correction unit 222 performs serial input. The decoding circuit 21 performs serial output. The error correction unit 222 is implemented by using one error corrector 2221. An input terminal of the error corrector 2221 is connected to the output terminal of the first latch unit 221. An enable terminal of the error correction unit 222 is connected to the output terminal of the decoding circuit 21. A time point at which an error correction code Correct<127:0> outputs each bit of data matches a time point at which the first latch unit 221 outputs each bit of data in data DataPre<127:0>. It should be noted that, a set of error correction codes Correct<127:0> may be repeatedly transmitted many times within a transmission period t (which is of a same length as a transmission period t of the first data), provided that a time point at which the first latch unit 221 outputs the data DataPre<127:0> matches a transmission time point of a particular set of error correction codes of the corresponding first data.

In the embodiment shown in FIG. 4, the error corrector 2221 includes an inverter INV and a pass transistor SR connected in parallel. An input terminal of the inverter INV and an input terminal of the pass transistor SR are connected as an input terminal of the error corrector 2221. An output terminal of the inverter INV and an output terminal of the pass transistor SR are connected as the output terminal of the error corrector 2221. An enable terminal of the inverter INV and an enable terminal of the pass transistor SR are both connected to the output terminal of the decoding circuit 21.

Each bit of data in DataPre<127:0> output by the first latch unit 221 corresponds to a corresponding bit in the error correction code Correct<127:0>. If an $x^{th}$ bit of data of the error correction code Correct<127:0> is 0, the inverter INV is cut off, the pass transistor SR is turned on, an $x^{th}$ bit of data DataPost<127:0> output by the error corrector 2221 is equal to an $x^{th}$ bit in DataPre<127:0>, and no error correction is performed. If a $y^{th}$ bit of data in the error correction code Correct<127:0> is 1, the inverter INV is turned on, the pass transistor SR is cut off, and a $y^{th}$ bit of the data DataPost<127:0> output by the error corrector 2221 is equal to inverted data of a $y^{th}$ bit in DataPre<127:0>. This achieves bitwise error correction of DataPre<127:0>, that is, the first data Data<127:0>, where both x and y are natural numbers. The foregoing data bit numbers are merely examples. During actual application, data bit numbers are set according to processing requirements.

Therefore, when implemented by using one error corrector 2221, the error correction unit 222 has one output terminal, the second latch unit 223 includes one M-bit shift register, and the second latch unit 223 performs serial input. The second latch unit 223 may perform either serial output or parallel output, depending on an external circuit requirement.

In an embodiment, the first latch unit 221 is connected to a first control unit 224, and the second latch unit 223 is connected to a second control unit 225. The first control unit 224 outputs a first control signal to control latching of the first latch unit 221. The second control unit 225 outputs a second control signal to control latching of the second latch unit 223.

Figure 5:
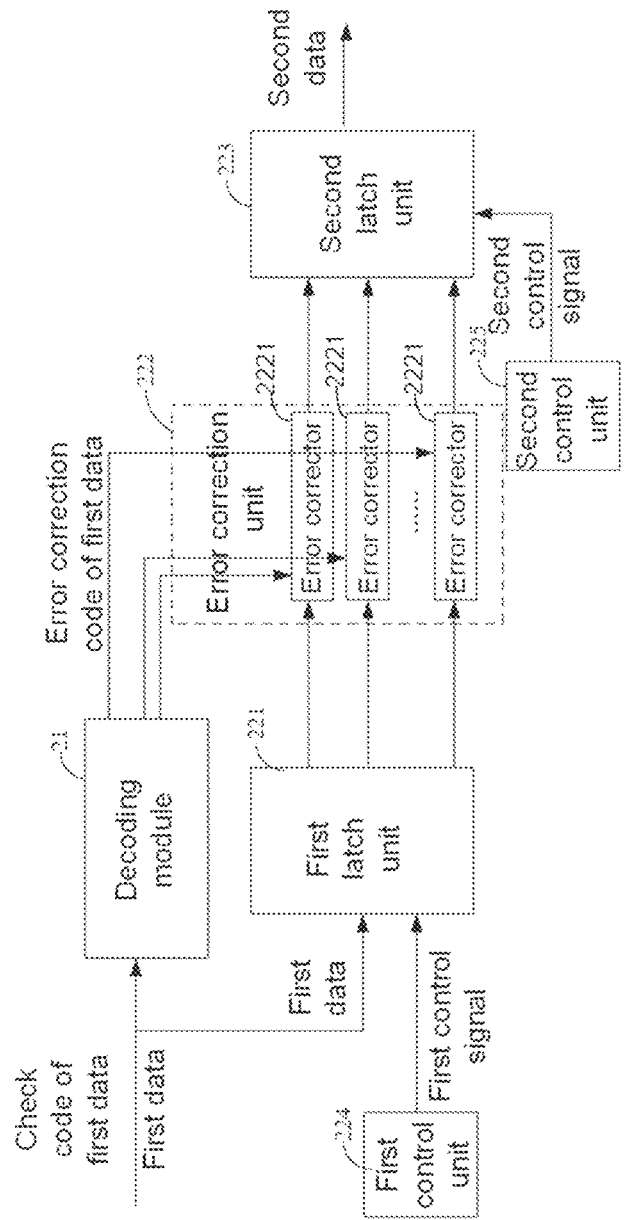
FIG. 5 is a circuit diagram of an error correction latch module according to another embodiment of the present disclosure.

FIG. 5 is a circuit diagram of an error correction latch module according to another embodiment of the present disclosure.

Referring to FIG. 5, in another embodiment, the first latch unit 221 may perform parallel output and includes M output terminals. Correspondingly, the decoding circuit 21 performs parallel output and includes M output terminals, and the error correction unit 222 includes M error correctors 2221. Each of the error correctors 2221 has an enable terminal connected to one output terminal of the decoding circuit 21, and each of the error correctors 2221 has an input terminal connected to one output terminal of the first latch unit 221. Further, the second latch unit 223 performs parallel input and has M input terminals. The second latch unit 223 may be implemented by using S K-bit shift registers, S*K=M, and S≥1. The error corrector 2221 is, for example, in a form shown in FIG. 4.

In addition, the first latch unit 221 may be either serial input or parallel input. The second latch unit 223 may perform either serial output or parallel output.

Similar to the embodiment shown in FIG. 4, the first latch unit 221 is controlled by the first control signal output by the first control unit 224 to start latching, and the second latch unit 223 is controlled by the second control signal output by the second control unit 225 to start latching.

Figure 6:
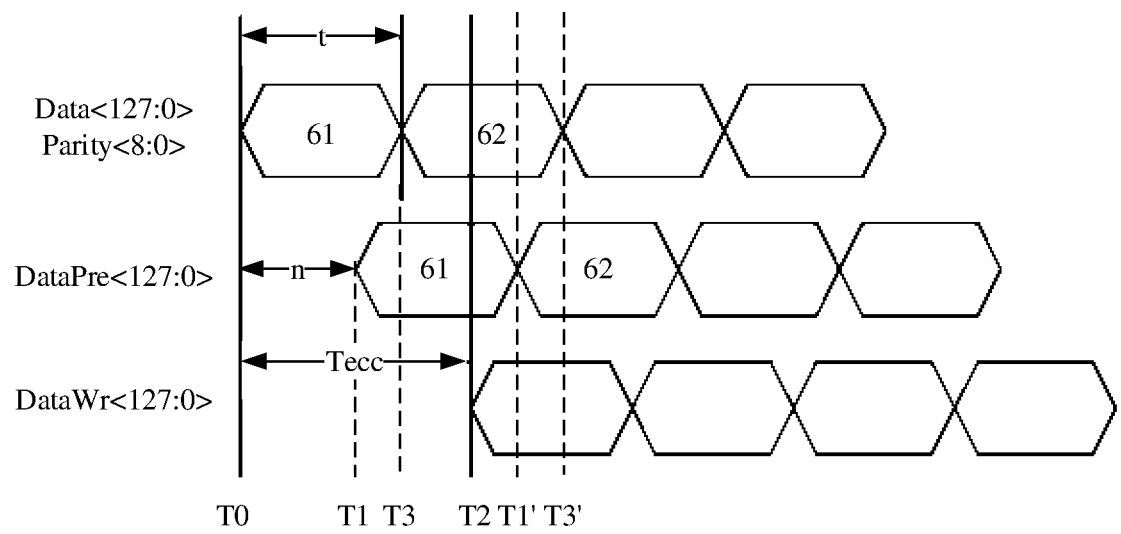
FIG. 6 is a timing diagram of data latching according to an embodiment of the present disclosure.

FIG. 6 is a timing diagram of data latching according to an embodiment of the present disclosure.

Referring to FIG. 6, in an embodiment, the first data Data<127:0> is alternately transmitted odd data or even data, a transmission interval between the odd data and the even data is t, and transmission of the first data Data<127:0> is completed within the transmission interval t. It can be understood that, the transmission interval t is equal to half the transmission period T of the odd data or even data shown in FIG. 1B.

The first control unit 224 is configured to control the first latch unit 221 to start latching the first data at a first time point T1, T1=n+mt, n is a relative delay time, a starting point of the relative delay time is a time point T0 at which the first data is transmitted to the decoding circuit 21, 0<n<t, and m is a natural number. The second control unit 225 is configured to control the second latch unit 223 to start latching at a particular time point between the first time point T1 and a next first time point T1'. The next first time point T1' is T1'=n+(m+1)t. In the embodiment shown in FIG. 6, m=0.

The second latch unit 223 starts to receive and output error-corrected second data DataWr<127:0> from a second time point T2. A time between the time point TO at which the first data Data<127:0> enters the decoding circuit 21 and the second time point T2 at which the second data DataWr<127:0> is output is a duration Tecc for checking and error correction of the first data. Tecc is greater than the transmission period t of the first data. Referring to FIG. 6, before the second time point T2, after the first data 61 arrives at the decoding circuit 21 for the time t, that is, at a third time point T3, the next first data 62 enters the decoding circuit 21, and the decoding circuit 21 starts calculating the next first data 62, but the first latch unit 221 still latches the first data 61 (output DataPre <127:0>) at this time (at the third time point T3), and until the time t elapses, and when arriving at the next third time point T3', the first latch unit 221 latches the next first data 62. When the error correction unit 222 and the second latch unit 223 are serial input and output, more data processing time is required. Therefore, the first latch unit 221 is controlled to latch the first data 61 is for the time t, thereby ensuring that as much data processing time as possible is provided for the error correction unit 222 while processing of the next first data 62 can be ensured.

It should be noted that, a time at which the decoding circuit 21 outputs an error correction code needs to be after the first time point T1 and before the third time point T3 at which transmission of the first data is completed (the time between T0 and T3 is t), that is, a maximum time for which the decoding circuit 21 performs checking and decoding is not greater than t, to ensure that each piece of first data can be checked and decoded.

In an embodiment, the first time point T1 at which the first latch unit 221 starts latching the first data may be controlled by the first control signal to align with timing of the first bit error correction code of the first data. When the first latch unit 221 performs serial output, a timing for the first latch unit 221 to output the data DataPre<127:0> may be controlled to be the same as a timing (a time point at which each bit is output) for the decoding circuit 21 to output the error correction code. In addition, after the second time point T2 at which the second latch unit 223 starts latching is controlled by the second control signal to be after the decoding circuit 21 outputs the error correction code, in extreme cases, the second time point T2 may be controlled to be equal to the time at which the error correction unit 222 starts outputting the data DataPost<127:0>. When the second latch unit 223 performs serial output, it is further required to control the time point at which the second latch unit 223 starts latching to be delayed with respect to the time point at which the decoding circuit 21 starts outputting the error correction code. This is because there is a delay between the time at which the error correction unit 222 receives the error correction code and a time at which the error correction unit 222 outputs a bit in DataPost<127:0>.

Figure 7:
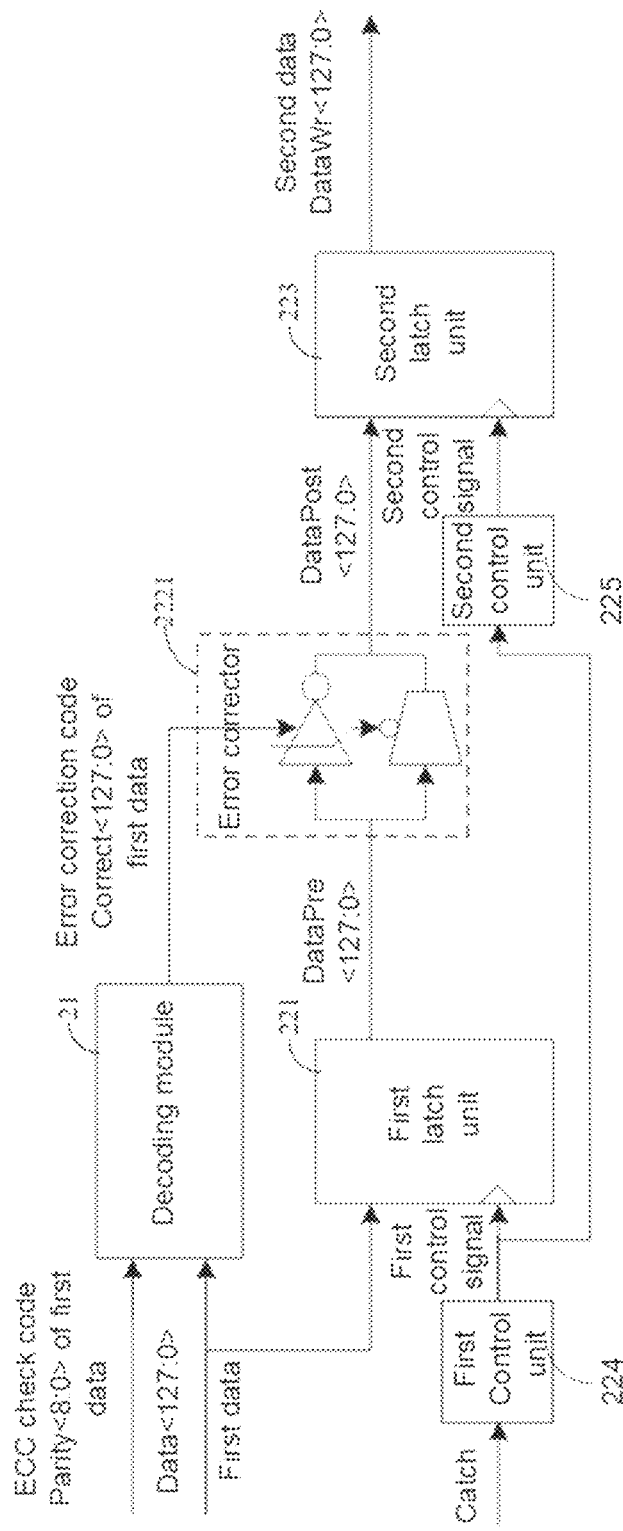
FIG. 7 is a schematic diagram of a first control unit and a second control unit according to an embodiment of the present disclosure.

FIG. 7 is a schematic diagram of a first control unit and a second control unit according to an embodiment of the present disclosure.

Referring to FIG. 7, in an embodiment, the second control unit 225 may have an input terminal connected to an output terminal of the first control unit 224. An input terminal of the first control unit 224 is used to receive a latch signal Catch. The first control unit 224 is configured to generate a first control signal based on the latch signal Catch. The second control unit 225 is configured to generate a second control signal based on the first control signal. The first control signal is used to control the first latch unit 221 to start latching. The second control signal is used to control the second latch unit 223 to start latching. Under excitation of the first control signal and the second control signal, the first latch unit 221 starts latching at the first time point T1, and the second latch unit 223 starts latching between the first time point T1 and the next first time point T1'. Specifically, the first control unit 224 and the second control unit 225 are each configured to delay an input signal to obtain a corresponding output signal. Adjustment of the delay of the first control unit 224 and the second control unit 225 can control a data output timing (a time point at which each bit is output) of the first latch unit 221 to be the same as a timing (a time point at which each bit is output) for the decoding circuit 21 to output the error correction code, and control a latching timing of the second latch unit 223 to be the same as a timing for the error correction unit 222 to output the data Data-Post<127:0>. That is, when the signal Catch and the first data are controlled to be input simultaneously, a delay time of the first control unit 224 may be equal to a decoding time of the decoding circuit 21, and a delay time of the second control unit 225 may be equal to a processing time of the error correction unit 222, that is, a time difference between data input and data output of the error correction unit 222.

According to the data error correction circuit provided in this embodiment of the present disclosure, an entire ECC operation with an operation time of Tecc is divided into smaller time intervals, and data with a transmission interval of t (t<Tecc) is checked and error-corrected, such that alternately transmitted odd data and even data can be checked and error-corrected by using one data error correction circuit, thereby reducing setting of one data error correction circuit in the data transmission circuit.

Figure 8:
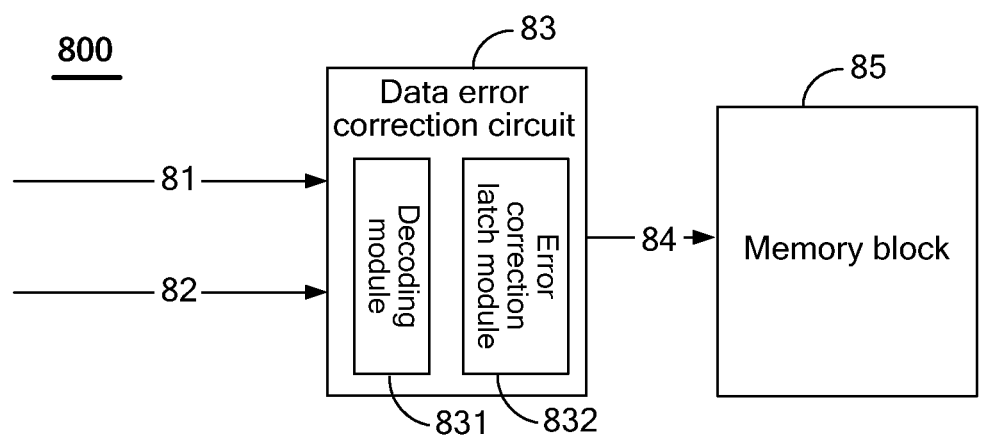
FIG. 8 is a schematic diagram of a data transmission circuit according to an embodiment of the present disclosure.

FIG. 8 is a schematic diagram of a data transmission circuit according to an embodiment of the present disclosure.

Referring to FIG. 8, in an embodiment, the data transmission circuit 800 may include:

an odd data signal line 81 configured to transmit odd data;

an even data signal line 82 configured to transmit even data, where the even data and the odd data are alternately transmitted at intervals, and there is a first time interval between a time of arrival of the even data and a time of arrival of the odd data; and the data error correction circuit 83 according to the foregoing embodiments, having an input terminal connected to the odd data signal line and the even data signal line and an output terminal connected to an output bus 84, where the output bus is electrically connected to a memory block 85, and the data error correction circuit 83 is configured to perform error correction on the odd data or the even data when the odd data or the even data is written into the memory block 85.

In an embodiment, the data error correction circuit 83 includes a decoding circuit 831 and an error correction latch module 832, the odd data or the even data enters the decoding circuit 831 at a first time point, the error correction latch module 832 outputs error-corrected data at a second time point, and an interval between the first time point and the second time point is greater than the first time interval.

Figure 9:
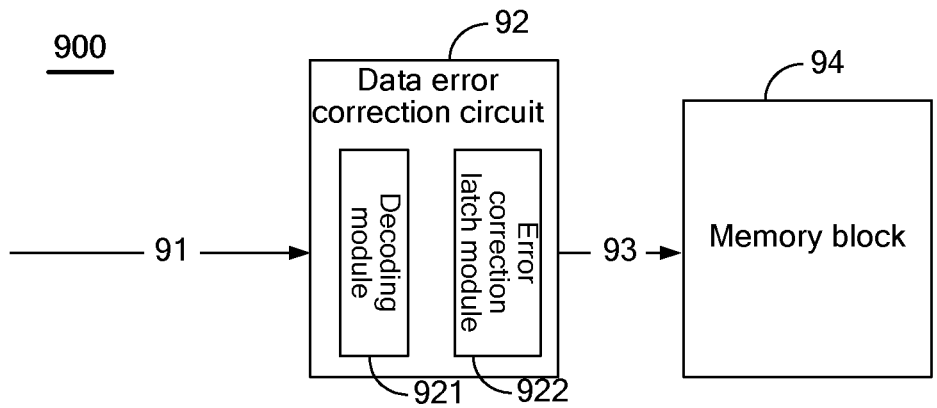
FIG. 9 is a schematic diagram of a data transmission circuit according to another embodiment of the present disclosure.

FIG. 9 is a schematic diagram of a data transmission circuit according to another embodiment of the present disclosure.

Referring to FIG. 9, in another embodiment, the data transmission circuit 900 may include:

a first data signal line 91 configured to transmit odd data and even data, where the even data and the odd data are alternately transmitted at intervals, and there is a first time interval between a time of arrival of the even data and a time of arrival of the odd data; and the data error correction circuit 92 according to the foregoing embodiments, having an input terminal connected to the first data signal line 91 and an output terminal connected to an output bus 93, where the output bus 93 is electrically connected to a memory block 94, and the data error correction circuit 92 is configured to perform error correction on the odd data or the even data when the odd data or the even data is written into the memory block 94.

The data error correction circuit 92 includes a decoding circuit 921 and an error correction latch module 922, the odd data or the even data enters the decoding circuit 921 at a first time point, the error correction latch module 922 outputs error-corrected data at a second time point, and an interval between the first time point and the second time point is greater than the first time interval.

In the embodiments of the present disclosure, a data error correction circuit is divided into two parts: a decoding circuit and an error correction latch module, and a data check and error correction process is divided into two parts: decoding and error correction. In this way, current data can be decoded by using the decoding circuit before arrival of the next data, and a processing procedure can be transferred to the error correction latch module when the next data is about to arrive, thereby avoiding interruption of the processing procedure of the current data due to the arrival of the next data or avoiding loss of the next data. Therefore, in the embodiments of the present disclosure, alternately transmitted odd data and even data can be sequentially processed by using one data error correction circuit, and during data transmission circuit design, one data error correction circuit is reduced to reduce a layout area occupied by a data transmission circuit, thereby reducing overall power consumption of the data transmission circuit.

It should be noted that although a number of modules or units of the device for execution are mentioned in the detailed description above, this division is not mandatory. In fact, according to the implementations of the present disclosure, the features and functions of two or more modules or units described above may be embodied in one module or unit. Correspondingly, the features and functions of a module or unit described above may be further divided into a plurality of modules or units to be embodied.

Those skilled in the art may easily figure out other implementation solutions of the present disclosure after considering the specification and practicing the application disclosed herein. This application is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and concept of the present disclosure are specified by the appended claims.

INDUSTRIAL APPLICABILITY

In the embodiments of the present disclosure, a data error correction circuit is divided into two parts: a decoding circuit and an error correction latch module, and a data check and error correction process is divided into two parts: decoding and error correction. In this way, current data can be decoded by using the decoding circuit before arrival of the next data, and a processing procedure can be transferred to the error correction latch module when the next data is about to arrive, thereby avoiding interruption of the processing procedure of the current data due to the arrival of the next data or avoiding loss of the next data. Therefore, in the embodiments of the present disclosure, alternately transmitted odd data and even data can be sequentially processed by using one data error correction circuit, and during data transmission circuit design, one data error correction circuit is reduced to reduce a layout area occupied by a data transmission circuit, thereby reducing overall power consumption of the data transmission circuit.

The invention claimed is:

1. A data error correction circuit, comprising:
 a decoding circuit, having an input terminal connected to a data bus, and configured to receive first data and a check code of the first data and output an error correction code of the first data based on the check code; and
 an error correction latch module, comprising a first latch unit, an error correction unit, and a second latch unit, the error correction latch module having a first input terminal connected to the data bus and a second input terminal connected to an output terminal of the decoding circuit, and configured to latch the first data corresponding to the error correction code and generate and output second data according to the error correction code and the corresponding first data;
 wherein the first data comprises M bits of data, and the first latch unit comprises N L-bit latches, wherein N*L=M, and N≥1:
 N=1, L=M, the first latch unit performs serial output, the decoding circuit performs serial output, the error correction unit comprises one error corrector, an input terminal of the error corrector is connected to an output terminal of the first latch unit, an enable terminal of the error correction unit is connected to the output terminal of the decoding circuit, and an output timing of the error correction code is the same as a data output timing of the first latch unit, the second latch unit comprises one M-bit shift register, and the second latch unit performs serial input; or the first latch unit performs parallel output and comprises M output terminals, the decoding circuit performs parallel output and comprises M output terminals, the error correction unit comprises M error correctors, each of the M error correctors has an enable terminal connected to one of the M output terminals of the decoding circuit, and each of the M error correctors has an input terminal connected to one of the M output terminals of the first latch unit, the second latch unit comprises S K-bit shift registers, S*K=M, the second latch unit performs parallel input, and S≥1;

the error corrector or each of the M error correctors comprises an inverter and a pass transistor connected in parallel.

2. The data error correction circuit of claim 1, wherein the first latch unit has an input terminal connected to the data bus, and is configured to latch the first data;

the error correction unit is connected to the output terminal of the first latch unit and the output terminal of the decoding circuit, and is configured to perform error correction on the corresponding first data according to the error correction code and output the second data after the error correction; and the second latch unit has an input terminal connected to an output terminal of the error correction unit, and is configured to latch and output the second data.

3. The data error correction circuit of claim 2, wherein the first latch unit is connected to a first control unit, the second latch unit is connected to a second control unit, the first control unit is configured to control the first latch unit to start latching at a time point n+mt, n is a relative delay time, a starting point of the relative delay time is a time at which the first data is transmitted to the decoding circuit, m is a natural number, t is a transmission interval of the first data, and n is greater than 0 and less than t; and the second control unit is configured to control the second latch unit to start latching between n+mt and n+(m+1)t.

4. The data error correction circuit of claim 3, wherein the second control unit has an input terminal connected to an output terminal of the first control unit.

5. The data error correction circuit of claim 2, wherein the first latch unit performs serial input or parallel input.

6. The data error correction circuit of claim 2, wherein the second latch unit performs serial output or parallel output.

7. The data error correction circuit of claim 1, wherein an input terminal of the inverter and an input terminal of the pass transistor are connected as the input terminal of the error corrector, an output terminal of the inverter and an output terminal of the pass transistor are connected as an output terminal of the error corrector or output terminals of the M error correctors, and an enable terminal of the inverter and an enable terminal of the pass transistor are both connected to the output terminal of the decoding circuit.

8. A data transmission circuit, comprising:
an odd data signal line, configured to transmit odd data;
an even data signal line, configured to transmit even data, wherein the even data and the odd data are alternately transmitted at intervals, and there is a first time interval between a time of arrival of the even data and a time of arrival of the odd data; and
the data error correction circuit of claim 1, having an input terminal connected to the odd data signal line and the even data signal line, and an output terminal connected to an output bus, wherein the output bus is electrically connected to a memory block; and
the data error correction circuit is configured to perform error correction on the odd data or the even data when the odd data or the even data is written into the memory block.

9. The data transmission circuit of claim 8, wherein the odd data or the even data enters the decoding circuit at a first time point, the error correction latch module outputs error-corrected data at a second time point, and an interval between the first time point and the second time point is greater than the first time interval.

10. A data transmission circuit, comprising:
a first data signal line, configured to transmit odd data and even data, wherein the even data and the odd data are alternately transmitted at intervals, and there is a first time interval between a time of arrival of the even data and a time of arrival of the odd data; and
the data error correction circuit of claim 1, having an input terminal connected to the first data signal line, and an output terminal connected to an output bus, wherein the output bus is electrically connected to a memory block, and
the data error correction circuit is configured to perform error correction on the odd data or the even data when the odd data or the even data is written into the memory block.

* * * * *